United States Patent
Li

(10) Patent No.: US 8,625,045 B2
(45) Date of Patent: Jan. 7, 2014

(54) LCD DEVICE AND BACKLIGHT MODULE THEREOF

(75) Inventor: Quan Li, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 99 days.

(21) Appl. No.: 13/375,480

(22) PCT Filed: Jun. 10, 2011

(86) PCT No.: PCT/CN2011/075626
§ 371 (c)(1),
(2), (4) Date: Nov. 30, 2011

(87) PCT Pub. No.: WO2012/142782
PCT Pub. Date: Oct. 26, 2012

(65) Prior Publication Data
US 2012/0268684 A1    Oct. 25, 2012

(51) Int. Cl.
*G02F 1/1333* (2006.01)

(52) U.S. Cl.
USPC ............... 349/58; 349/64; 349/65; 362/97.2; 362/97.4; 362/633

(58) Field of Classification Search
USPC ............... 349/58, 62, 65, 64; 362/97.4, 97.1, 362/97.2, 633, 634
See application file for complete search history.

(56) References Cited

U.S. PATENT DOCUMENTS

| 6,552,761 B1 * | 4/2003 | Seo et al. ............. 349/58 |
| 2008/0111937 A1 | 5/2008 | Chen |
| 2010/0020816 A1 | 1/2010 | Gulati et al. |

FOREIGN PATENT DOCUMENTS

| CN | 201348220 Y | 11/2009 |
| EP | 0627638 A1 | 12/1994 |
| JP | 11-153965 A | 6/1999 |

* cited by examiner

*Primary Examiner* — Thoi Duong
(74) *Attorney, Agent, or Firm* — Cheng-Ju Chiang

(57) ABSTRACT

A backlight module is disclosed. The backlight module comprises a first optical film, a second optical film, a backplate frame, and an optical film supporting device adapted to splice and support the first optical film and the second optical film. The optical film supporting device comprises a body, a splicing portion and a fixing portion. The splicing portion is adapted to splice and support the first optical film and the second optical film, and the fixing portion is fixed to the backplate frame. A liquid crystal display (LCD) device comprising the backlight module described above is also disclosed. By providing an optical film supporting device in the backlight module of the present invention, two or more optical films can be spliced by the optical film supporting device to satisfy the demands for a large-sized optical film. This solution is practical, reliable and low in the cost.

16 Claims, 3 Drawing Sheets

LCD DEVICE AND BACKLIGHT MODULE THEREOF

TECHNICAL FIELD

The present invention generally relates to the field of display technologies, and more particularly, to a liquid crystal display (LCD) device and a backlight module thereof.

BACKGROUND

Owing to the advancement in generation lines of liquid crystal panels, the liquid crystal panels are now made to be increasingly larger in size. For example, the G8.5 generation lines that have become relatively matured can produce liquid crystal panels of 110 inches in size.

With the ever increasing size of liquid crystal panels, sizes of some components of backlight modules used as light source systems in the liquid crystal panels shall be correspondingly increased. However, as restricted by the processing capability of current available manufacturing facilities, some components of the backlight modules cannot be made to have a desired large size. As an example, the processing equipment is unable to produce a diffuser of such a desired large size. On the other hand, to research and develop new equipments for such a purpose will represent a high risk and lead to a significant increase in the cost, so it is not preferred.

SUMMARY OF THE INVENTION

An objective of the present invention is to provide a novel liquid crystal display (LCD) device and a backlight module, which can solve the problem with the prior art that some components of the backlight module cannot be made to have a desired large size due to the restricted processing capability of the existing manufacturing facilities.

To achieve this objective, the present invention provides a backlight module, which comprises a first optical film, a second optical film, a backplate frame and an optical film supporting device. The optical film supporting device is adapted to splice and support the first optical film and the second optical film, and comprises a body, a splicing portion and a fixing portion. The splicing portion is adapted to splice and support the first optical film and the second optical film, and the fixing portion is fixed to the backplate frame.

According to a preferred embodiment of the present invention, the optical film supporting device is made of a transparent material.

According to a preferred embodiment of the present invention, the splicing portion comprises first receiving recesses and second receiving recesses arranged alternately, the first optical film comprises first edge tabs, the second optical film comprises second edge tabs, the first edge tabs are received in the first receiving recesses respectively and the second edge tabs are received in the second receiving recesses respectively.

According to a preferred embodiment of the present invention, the first receiving recesses and the second receiving recesses are disposed on a top surface of the splicing portion.

According to a preferred embodiment of the present invention, the first receiving recesses and the second receiving recesses are disposed within the splicing portion.

According to a preferred embodiment of the present invention, the body comprises a plurality of through-holes.

According to a preferred embodiment of the present invention, the body comprises a plurality of thinned regions.

According to a preferred embodiment of the present invention, the fixing portion is fixed to the backplate frame by means of a screw, an adhesive or a snap-fitting structure.

According to a preferred embodiment of the present invention, the first optical film and the second optical film are diffusers.

To achieve the aforesaid objective, the present invention further provides an LCD device, which comprises a liquid crystal panel and a backlight module. The backlight module comprises a first optical film, a second optical film, a backplate frame and an optical film supporting device. The optical film supporting device is adapted to splice and support the first optical film and the second optical film, and comprises a body, a splicing portion and a fixing portion. The splicing portion is adapted to splice and support the first optical film and the second optical film, and the fixing portion is fixed to the backplate frame.

The present invention has the following benefits: by providing an optical film supporting device in the backlight module and the LCD device of the present invention, two or more optical films can be spliced and supported by the optical film supporting device to satisfy the demands for a large-sized optical film. This solution is practical, reliable and low in the cost.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF EMBODIMENTS

Reference will now be made to the drawings to describe preferred and exemplary embodiments of the present invention in detail.

Figure 1:
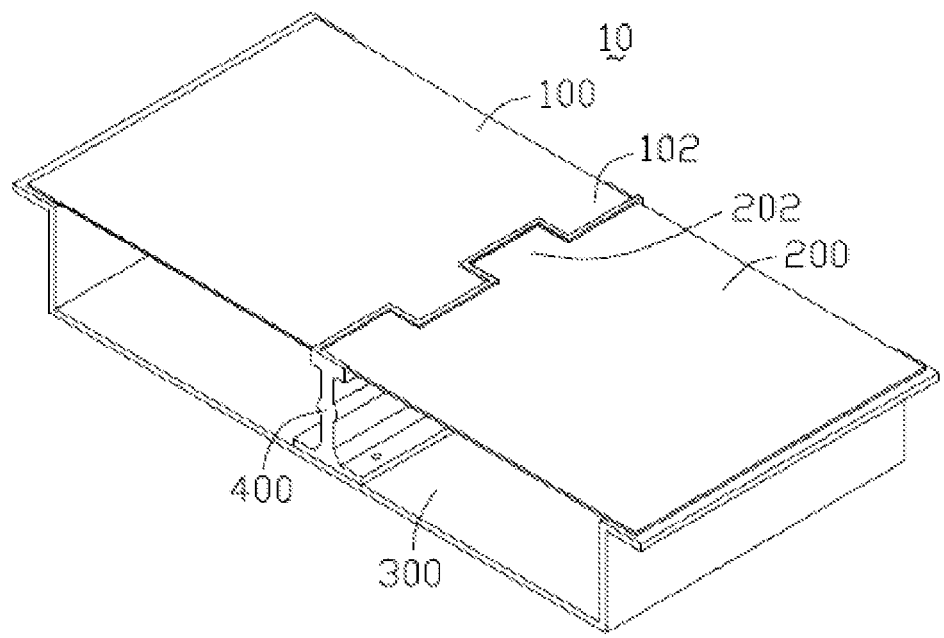
FIG. 1 is a schematic structural view of a preferred embodiment of a backlight module according to the present invention.

Referring to FIG. 1, the present invention provides a backlight module 10, which comprises a first optical film 100, a second optical film 200, a backplate frame 300 and an optical film supporting device 400.

The optical film supporting device 400 is adapted to splice and support the first optical film 100 and the second optical film 200. The optical film supporting device 400 is integrally formed of a transparent material through injection molding to ensure uniform light output at the interface between the first optical film 100 and the second optical film 200. For example, the optical film supporting device 400 may be made of a transparent material such as polymethyl methacrylate (PMMA) or polycarbonate (PC).

Specifically, referring to FIGS. 1 to 4 together, the optical film supporting device 400 primarily comprises a body 410, a splicing portion 420 and a fixing portion 430. Hereinafter, three embodiments of the optical film supporting device 400 will be described.

Figure 2:
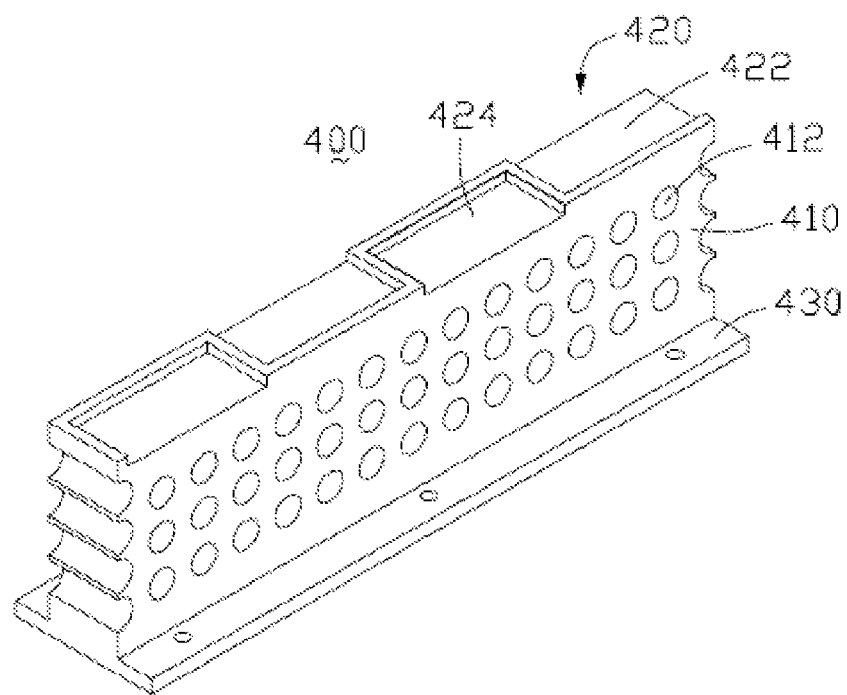
FIG. 2 is a schematic structural view of a first embodiment of an optical film supporting device in the backlight module according to the present invention.

Referring to FIG. 2, in a first embodiment of the optical film supporting device 400, the body 410 has a certain height, and is adapted to support the first optical film 100 and the second optical film 200. In order to save the material cost, the body 410 is formed with a plurality of through-holes 412 to reduce the amount of material used in the injection molding process. However, the shape of the body 410 is not merely limited to what shown in FIG. 2.

The splicing portion 420, which is located at the top of the body 410, is adapted to splice the first optical film 100 and the second optical film 200. Specifically, the splice portion 420 comprises first receiving recesses 422 and second receiving recesses 424 arranged alternately. The first optical film 100 comprises first edge tabs 102, and the second optical film 200 comprises second edge tabs 202. The first edge tabs 102 are received in the first receiving recesses 422 respectively, and the second edge tabs 202 are received in the second receiving recesses 424 respectively. In this embodiment, the first receiving recesses 422 and the second receiving recesses 424 are in the form of rectangular recesses and alternately arranged on a top surface of the splicing portion 420.

The fixing portion 430 is located at the bottom of the body 410, and can be fixed to the backplate frame 300 by means of a screw, an adhesive or a snap-fitting structure.

Figure 3:
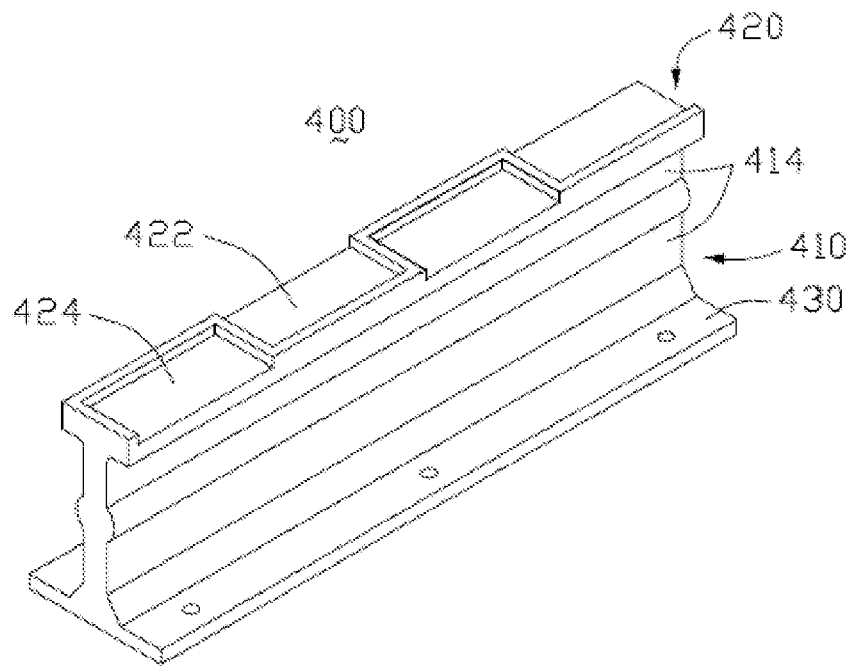
FIG. 3 is a schematic structural view of a second embodiment of the optical film supporting device in the backlight module according to the present invention.

Referring next to FIG. 3, a second embodiment of the optical film supporting device 400 is shown therein. The structure of the second embodiment is substantially the same as that of the first embodiment described above, and thus, will not be further described herein. However, the second embodiment of the optical film supporting device 400 differs from the second embodiment mainly in that, a plurality of thinned regions 414 are formed at both sides of the body 410 in order to save the material cost. As shown in FIG. 3, the body 410 is formed with two transverse thinned regions 414 on each side. Of course, the shapes and amount of the thinned regions 414 are not merely limited to what shown in FIG. 3.

Figure 4:
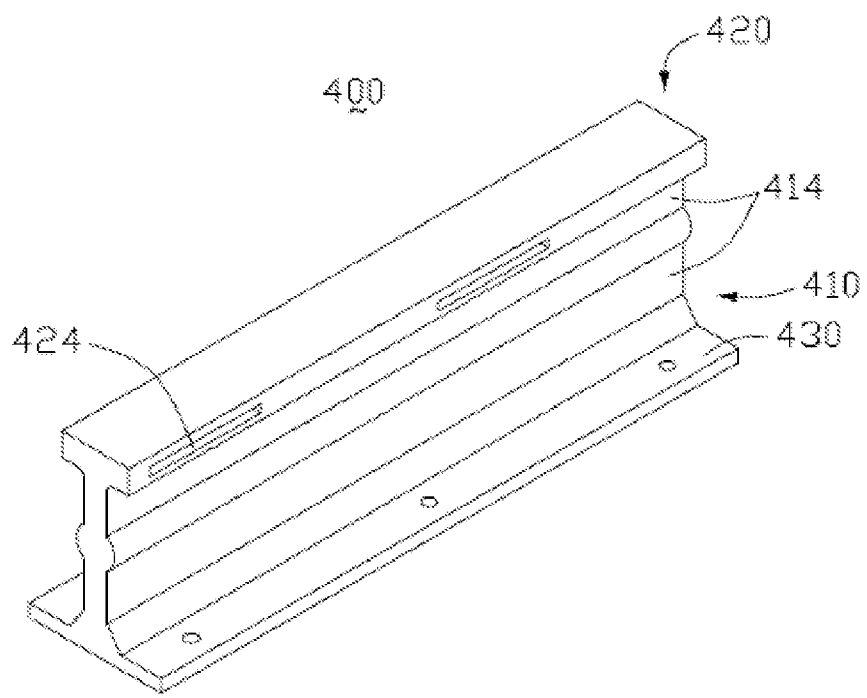
FIG. 4 is a schematic structural view of a third embodiment of an optical film supporting device in the backlight module according to the present invention.

Referring next to FIG. 4, a third embodiment of the optical film supporting device 400 is shown therein. The structure of the third embodiment is substantially the same as that of the second embodiment described above, and thus, will not be further described herein. However, the third embodiment of the optical film supporting device 400 differs from the second embodiment mainly in that, the first receiving recesses 422 and the second receiving recesses 424 are disposed within the splicing portion 420, so splice of the first optical film 100 and the second optical film 200 with the optical film supporting device 400 is made more compact.

In the embodiments of the present invention, the first optical film 100 and the second optical film 200 may be diffusers, brightness enhancement films (BEF) or other appropriate optical components.

Accordingly, as will be readily appreciated by those skilled in the art, the present invention has the following benefits: by providing an optical film supporting device 400 in the backlight module 10 of the present invention, two or more optical films can be spliced by the optical film supporting device 400 to satisfy the demands for a large-sized optical film. This solution is practical, reliable and low in the cost.

Figure 5:
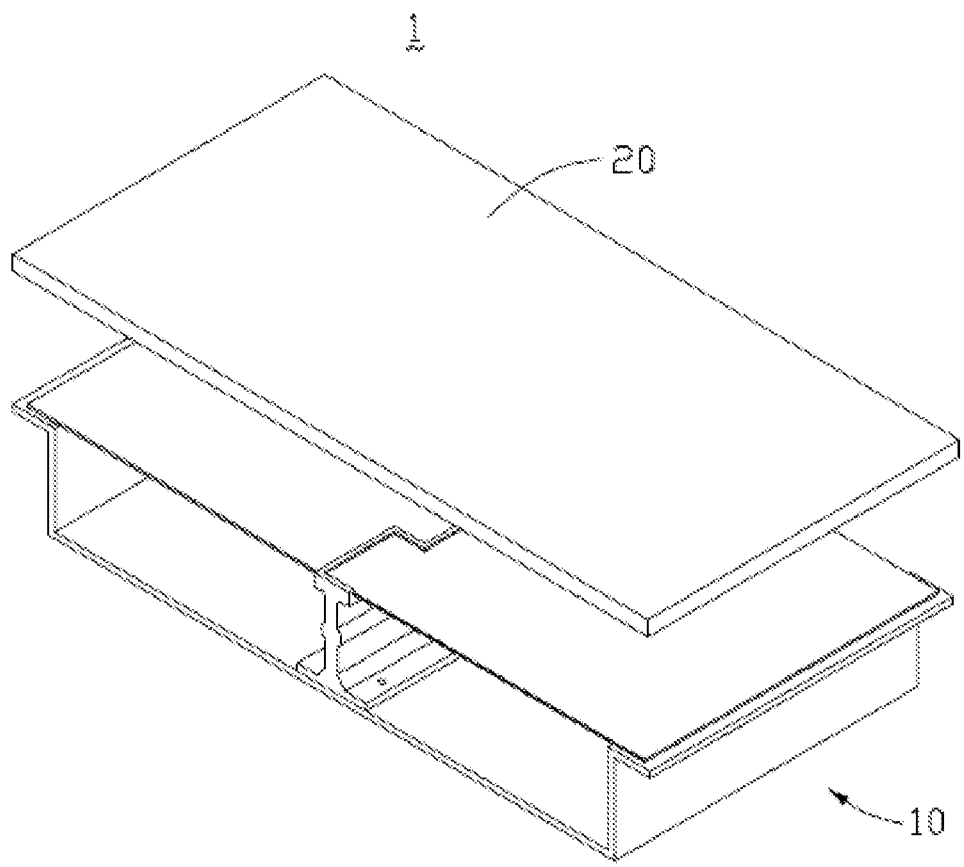
FIG. 5 is a schematic structural view of a preferred embodiment of an LCD device according to the present invention.

Referring to FIG. 5, the present invention further provides an LCD device 1, which comprises a liquid crystal panel 20 and the backlight module 10 described above.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising a first optical film, a second optical film and a backplate frame, wherein the backlight module further comprises an optical film supporting device for splicing and supporting the first optical film and the second optical film, the optical film supporting device comprising:
   a body;
   a splicing portion for splicing and supporting the first optical film and the second optical film; and
   a fixing portion fixed to the backplate frame;
   wherein the optical film supporting device is made of a transparent material.

2. The backlight module of claim 1, wherein the splicing portion comprises first receiving recesses and second receiving recesses arranged alternately, the first optical film comprises first edge tabs, the second optical film comprises second edge tabs, the first edge tabs are received in the first receiving recesses respectively and the second edge tabs are received in the second receiving recesses respectively.

3. The backlight module of claim 2, wherein the first receiving recesses and the second receiving recesses are disposed on a top surface of the splicing portion.

4. The backlight module of claim 2, wherein the first receiving recesses and the second receiving recesses are disposed within the splicing portion.

5. The backlight module of claim 1, wherein the body comprises a plurality of through-holes.

6. The backlight module of claim 1, wherein the body comprises a plurality of thinned regions.

7. The backlight module of claim 1, wherein the fixing portion is fixed to the backplate frame by means of a screw, an adhesive or a snap-fitting structure.

8. The backlight module of claim 1, wherein the first optical film and the second optical film are diffusers.

9. A liquid crystal display (LCD) device, comprising a liquid crystal panel and a backlight module, wherein the backlight module comprises a first optical film, a second optical film and a backplate frame, and the backlight module further comprising an optical film supporting device for splicing and supporting the first optical film and the second optical film, the optical film supporting device comprising:
   a body;
   a splicing portion for splicing and supporting the first optical film and the second optical film; and
   a fixing portion fixed to the backplate frame;
   wherein the optical film supporting device is made of a transparent material.

10. The LCD device of claim 9, wherein the splicing portion comprises first receiving recesses and second receiving recesses arranged alternately, the first optical film comprises first edge tabs, the second optical film comprises second edge tabs, the first edge tabs are received in the first receiving recesses respectively and the second edge tabs are received in the second receiving recesses respectively.

11. The LCD device of claim 10, wherein the first receiving recesses and the second receiving recesses are disposed on a top surface of the splicing portion.

12. The LCD device of claim 10, wherein the first receiving recesses and the second receiving recesses are disposed within the splicing portion.

13. The LCD device of claim 9, wherein the body comprises a plurality of through-holes.

14. The LCD device of claim 9, wherein the body comprises a plurality of thinned regions.

15. The LCD device of claim 9, wherein the fixing portion is fixed to the backplate frame by means of a screw, an adhesive or a snap-fitting structure.

16. The LCD device of claim 9, wherein the first optical film and the second optical film are diffusers.

\* \* \* \* \*